Jan. 25, 1966  P. E. SLAVIN  3,231,886
ANALOG-DIGITAL CONVERTERS
Filed Aug. 19, 1963  2 Sheets-Sheet 1

INVENTOR.
PETER E. SLAVIN

PETER E. SLAVIN

United States Patent Office 3,231,886
Patented Jan. 25, 1966

3,231,886
ANALOG-DIGITAL CONVERTERS
Peter E. Slavin, Winchester, Mass., assignor to Loral Electronics Corporation, New York, N.Y.
Filed Aug. 19, 1963, Ser. No. 302,859
9 Claims. (Cl. 340—347)

This invention relates to the field of analog to digital convertors. By conversion is meant the successive comparison of known and unknown signals so as to yield a digital code representing the unknown signal at the time of conversion. This signal may be, for example, the output of a temperature transducer which has been amplified. The digital signal from the convertor will then represent temperature at the time of the conversion. This may then be transmitted on a telemetry link, or printed out on paper. To give another example, the signal could be from an analog computer; and the digital output displayed to the operator of that computer.

The invention particularly relates to a new type of convertor making use of decimal logic and cold-cathode counting tubes, and having a magnetic method for comparing two or more quantities (electrical currents).

The principle of nearly all such convertors is that of a series of comparisons of a known digital signal with the unknown signal. The result of each comparison is used to make the digital signal magnitude alter so as to approach the unknown signal magnitude. The series is ended, one such "conversion" is complete, when the digital signal exactly represents the magnitude of the unknown one, within the error of the system "resolution," or some arbitrary limit set on this resolution.

A survey of convertors may be found in part 8 (p. 103) of the 1953 Convention Record of the (then) Institute of Radio Engineers. It is "A Systematic Study of Coders and Decoders" by Lipel. It will be seen from this paper that the conventional series of comparison digits is one based upon descending powers of the radix 2 (i.e. binary).

The digits are usually represented by currents, each current (digit) being changed by the switching of different precision resistors. The sum of these digital currents is then compared to the unknown current by allowing (for example) the net current to charge a small capacity. Upon shorting this capacity, the voltage change will indicate the relative magnitudes.

The accuracy or resolution of such systems depends upon the voltage supply for these currents being very stable despite current variation. It depends upon the stability of the digital ratio of the precise resistors in series to this voltage. The switch in series may also have characteristics, such as emitter-collector voltage in a transistor, which affect accuracy. Finally, the device for comparing known and unknown currents must be both stable and sensitive, The cost of such systems will be a function of:
(a) the series switches on the digital currents,
(b) the circuits to turn these switches on and off in sequence,
(c) the precision resistors,
(d) the power supply,
(e) the comparison device,
(f) the devices to translate the switch positions into a digital display at the end of conversion.

This system makes use of decimal logic and cold-cathode counting tubes, which have a visual display. Each digital switch consists of one cathode (of the ten in each tube) together with a silicon diode that "clamps" this cathode's current to a Zener diode voltage. While there are more switches in such a decimal system, the switch simplicity means an economy on factors (a) and (d) of the last paragraph. The tube's counting action and visual indication mean an economy in (b) and (f).

The comparison device is a toroidal tape core of high $U_0$ (permeability) material, having winding turns in proportion to digital weight. This means a stable and sensitive device, making for high accuracy. It also allows almost all of the precision resistors to be identical, with resultant economy and better ratio stability.

The decimal logic has been made very simple by the introduction of an additional switch to give one hundred units (digital M.M.F.); this switch turns off as the tens counting tube begins to subtract digital M.M.F.

All of the devices used in this invention have a longer life than electromechanical switches. These devices in this system are faster than such switches.

Accordingly, it is an object of this invention to ascertain the presence of small M.M.F.'s in a core, and especially to yield a reliable indication of the polarity of these M.M.F.'s (magnetizing forces).

Another object of this invention is to assign digital weights for a well-defined current by making the number of turns on a core proportional to these weights.

Still another object is to employ identical precision resistors for most of these M.M.F. current paths, such that initial resistor mismatch, and long-term stability, are improved over those convertors where the resistor varies with digit value.

Yet another object is to employ a decimal cold-cathode means to generate these digital currents, such that there is an economy in the switching, and means to sequence these switches.

Yet another object is to make use of a passive (Zener) voltage source to generate these precise voltages or currents, with the current from this source being essentially constant.

Still another object is the use of cold-cathode counting tubes for both the sequence (programming) and for the major part of the switches which control the precise currents.

Yet another object is the use of cold-cathode tubes such that they give a direct indication of their "count" position by a glow. This results in an economical means to read out the results of a conversion, and makes any faulty operation apparent at once to an experienced operator.

To assist the detailed description of this invention there are given five figures. FIGURE 1 gives the magnetizing characteristics for two types of material, one with high initial permeability, and the other with a square characteristic having low initial permeability.

Figures 4, 5:
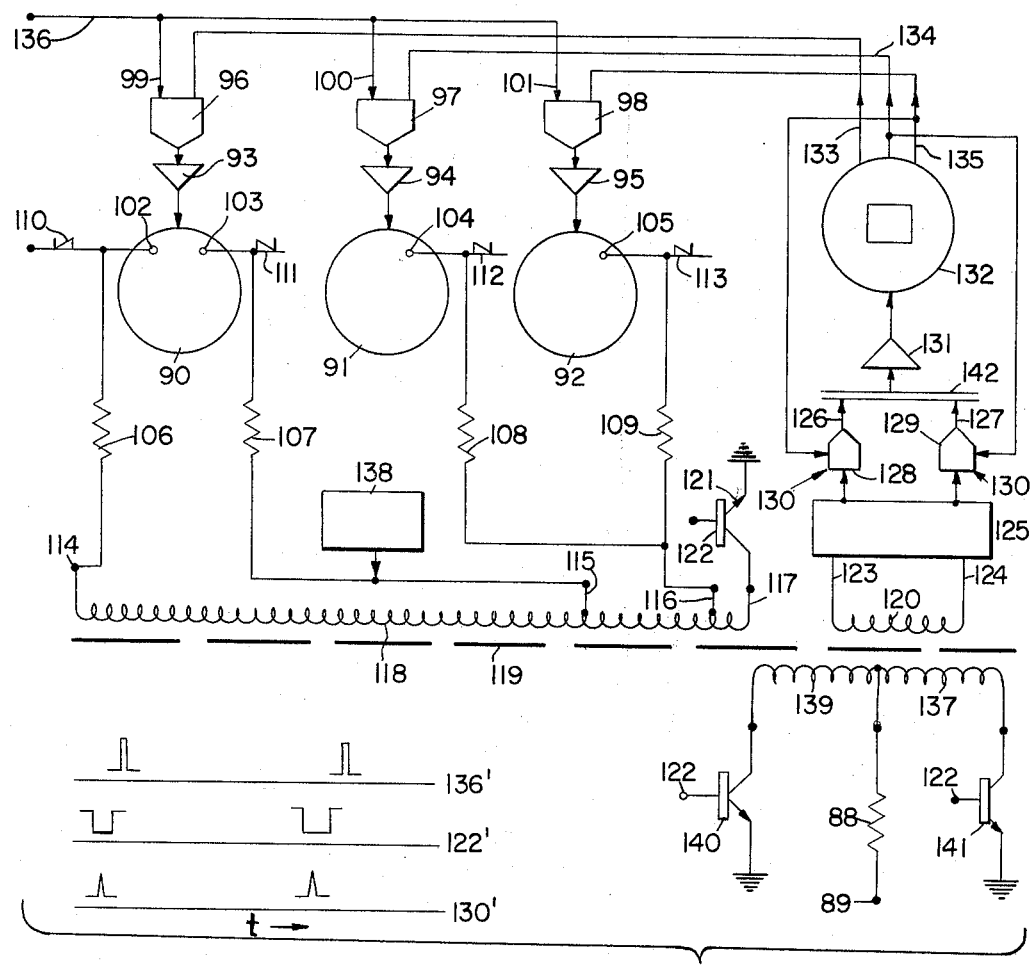

FIGURE 4 has in it the essential logical elements to explain how a three decimal converter acts, making use of the magnetic comparison at each step to control the count action of the next step.

FIGURE 5 gives a frontal view of three decimal cold-cathode tubes, and an example of the glow steps taken in one conversion. The logic steps in this example are illustrated in a table later in this specification.

Figure 1:
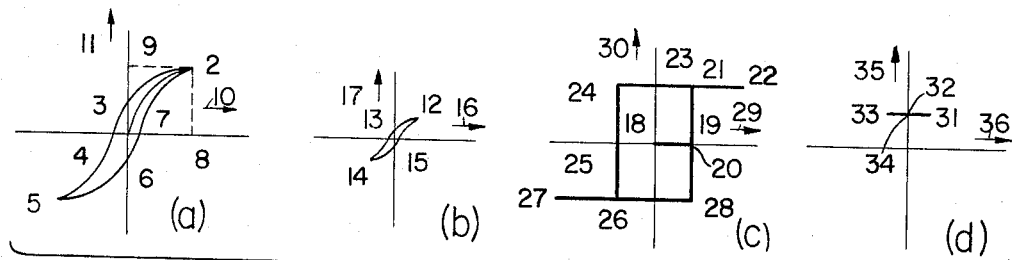

Referring now in detail to the drawings, FIGURES 1a and 1b are the magnetizing characteristics for a core having a high initial permeability, such as material Supermalloy or Hy-Mu 80, on a tape toroid such as Magnetics 50032. FIGURES 1c and 1d are the same characteristics for a core material, with low initial "square-loop" permeability. The magnetizing force is measured along the horizontal axis in each case (10, 16, 29, 36), and is termed H for Oersteds. It is proportional to the net ampere-turns on that core, and is often called M.M.F.

The magnetization caused by this force is measured along the vertical axis in each of (a), (b), (c), (d), i.e. 9, 17, 30, and 35 respectively. This magnetization is called "flux." Te permeability is the slope of the B–H (flux-M.M.F.) characteristic, and is termed $u$, or $U_0$ at zero net M.M.F.

FIGURES 1a and 1c are for large M.M.F.'s (H), and it is seen that the characteristics differ radically. For the high $U_0$ material of 1a, as the M.M.F. (H) increases to the right from point 1, the flux (B) at first increases rapidly and then more slowly as M.M.F. reaches value 8, corresponding to point 2. For M.M.F.'s (H) larger than 8 there will be almost no change of flux (B); that is, the core is said to be "saturated." Upon decreasing the M.M.F. to zero once more, the flux will revert, not to zero, but to the value at 3. This is termed "residual," or $B_r$. If the M.M.F. be then increased in an opposite sense, i.e. to the left in FIGURE 1a, then the flux (B) will become zero at some M.M.F. termed the "coercive," or $H_c$. Further M.M.F. to the left will take the characteristic to point 5, where the core is approaching negative saturation. Then, for permitting the M.M.F. to traverse to the right once more, to point 8 value, the same phenomena repeat. That is, negative residual at 6, and positive coercive at 7.

FIGURE 1c is the magnetizing characteristic of some material such as Orthonal, i.e. a "square-loop" material. As the M.M.F. (H) is increased to the right (or to the left) there is at first hardly any change of flux (B). Thus, considerable M.M.F. (H or current) is traversed from point 18 to point 19 with barely any flux change. There is only a small flux increment, that measured by the vertical 19 to 20. Further increase of M.M.F. to the right yields a rapid increase of flux to point 21, and subsequently very small flux change, i.e. saturation effect.

Upon forcing the M.M.F. to travel to the left, there is first encountered the large positive "residual" flux at 23 ($B_r$), and then the "knee" at 24 where flux begins to change. This M.M.F. (H) at point 24 is very nearly that at point 25, the negative coercive force. These phenomena repeat as the "loop" is traversed from 25 to 26, 27, 28, and back to 19. If the M.M.F. (H) is allowed to go to zero (no net current-turns) at 19, the core state reverts to that at point 18, wih negligible flux change.

FIGURE 1b gives the B–H characteristic for small change of M.M.F. (H). This characteristic is termed a "minor loop." Essentially this is a repetition of the "major loop" of FIGURE 1a, without the saturation effect. The relatively large change of flux (B) for small change of (H) can be noted. Proceeding from a positive residual point as 13 to point 12 yields almost as large a flux change as from a negative residual 15 to point 12. Interruption of all current so that M.M.F. (axis 16) reverts to zero, will cause an appreciable negative flux change (12 to 13). If the M.M.F. be negative (point 14) and be interrupted, the change of flux will be positive (14 to 15).

FIGURE 1d is the "minor loop" characteristic of a square-loop material. As the M.M.F. travels positive from point 34 to 31 there is almost no flux change, and the same applies if the M.M.F. is then forced to return to zero (point 32). This minor loop may be placed anywhere along the vertical axis between the residual limits, and this statement applies.

The flux change is important to this invention, because this invention determines whether the M.M.F. (which may be very small) is to the right or left of zero by interrupting (switching off) all M.M.F. The resultant change of flux will then "cut" the turns on an output winding, giving a voltage ("back E.M.F.") whose polarity corresponds to the right or left polarity of the M.M.F. prior to interruption.

It is possible to "detect" the state of M.M.F. in FIGURE 1c if this M.M.F. exceeds the coercive value 20, by the familiar "interrogation" pulse driving the core. But this is a very insensitive means since it calls for relatively very large M.M.F.'s in order to ensure detection. There are other methods for trying to detect small M.M.F., usually based upon the distortion in a driving pulse introduced by the non-symmetrical position of the M.M.F. in relation to the coercive M.M.F.'s. All are unsatisfactory because they demand a precise driving pulse and assume a precisely defined coercive M.M.F. not varying from core to core, or with temperature.

Figure 2:
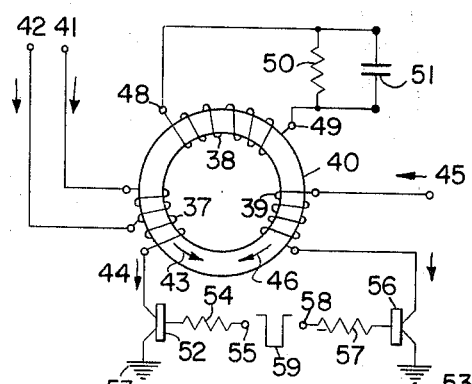
FIGURE 2 is that of a toroid transformer having three windings on it, and a means for interrupting all magnetizing current in these windings.

In FIGURE 2 there is shown a core having three windings, 37, 39 and 38. These will be called the digital, the signal, and the sense windings respectively. The core itself has the high $U_0$ characteristic of FIGURES 1a and 1b. There are two transistor switches, 52 and 56, between the digital winding 37 and ground and between the signal winding 39 and ground respectively.

Initially let the switches be "on," i.e. conducting current from terminals 44 to 53, and from 47 to 53, with negligible voltage drop. If a precisely defined current enter the digital winding at 41, as shown by the arrow, and leave at terminal 44, it will cause an M.M.F. (magnetizing force) proportional to this current times four turns. This M.M.F. will be in the direction of arrow 43, as follows from the familiar right-hand rule. If another current of the same dimension enter at terminal 42 and emerge at terminal 44, it will cause another M.M.F. proportional to this current times two turns. These M.M.F.'s, being in the same sense, will add to six current-turns in direction 43.

At terminal 45 an unknown signal current enters, emerging from the signal winding at terminal 47. Again, by use of the right-hand rule, this will give an M.M.F. in the direction of 46. This M.M.F. will oppose that of the digital winding. If this signal M.M.F. 46 be measured as four current-turns, then the net core M.M.F. (as the sense winding contributes no M.M.F. at this time) will be two current-turns in the direction 43.

Having established this net M.M.F., let both transistor switches 52 and 56 be opened at time $t_0$. That is, let a negative-going pulse 59 enter at points 55 and 58, and bias the base-emitters negative via resistors 54 and 57 respectively. Then, as explained previously for FIGURE 1, the M.M.F. will fall towards zero, giving a flux change such that, by "cutting" the winding 37, 38 and 39, "back E.M.F. voltages" are produced across these windings.

Since the switches 52 and 56 are off during this interval (say, 100 microseconds) only winding 38 is free to conduct a current. This current, by well-known physical laws, will be of such a polarity as to try to maintain the M.M.F. 43. That is, terminal 48 will be positive with regard to terminal 49, and current flows through the winding, and from 48 to 49 via resistor 50 and capacity 51. Thus, there will be a rise of voltage at terminal 48, which will then exponentially decay at a rate determined by the load, resistor 50 and capacity 51. Also contributing to the initial rise and wave-shape will be the number of turns on sense winding 38. If the original signal current in at 45 had been two units in place of one, then it is evident that the net M.M.F. around the core would be two current-turns in the direction of 46. Then, in this case, at time $t_0$, the flux decay would be such as to give the opposite polarity voltage across sense winding 38; that is, terminal 49 would then be positive with respect to terminal 48.

After some interval the switches 52 and 56 are again turned on by the voltage into their base terminals 55 and 58 returning to a positive level. There is, then, at this instant, another pulse induced into sense winding 38 as the net M.M.F. is restored, this pulse being of opposite polarity to that produced at time $t_0$. This pulse is also to some degree a measure of net M.M.F., but is much less exact owing to differing current rise times.

In the working model a Magnetics 50032 tape toroid of Hy-Mu 80 material was used. Digital winding 37 had 900 turns, and included the two end terminals and 17 intermediate (tap) terminals. Signal winding 39 was of 480 turns, and sense winding approximately 500 turns. The interruption (test) pulse 59 was 100 microseconds long, and the minimum M.M.F. difference gave a sense winding voltage pulse of 15 millivolts peak by 50 microseconds long.

Figure 3:
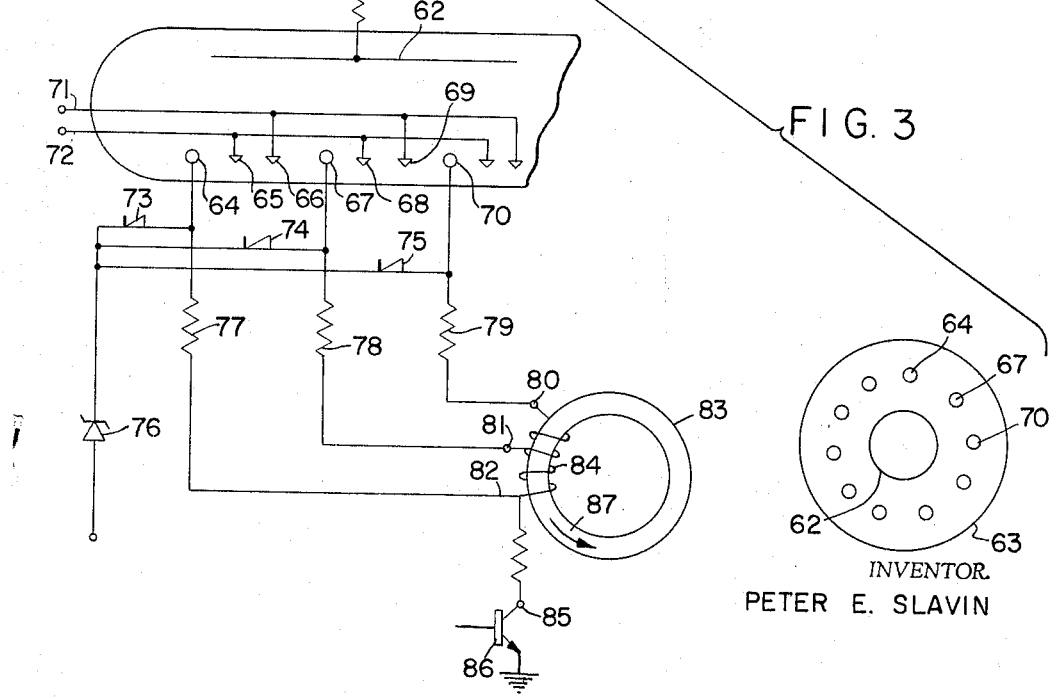
FIGURE 3 shows one decimal counting tube, three of the ten cathodes in that tube, and how those cathodes are connected to the windings on the core. It also gives the cathode arrangement in an end view of a typical tube.

In FIGURE 3 there is shown a decimal counting tube 63, including three of its ten cathodes (64, 67, 70), the cathode clamping circuits, and the connections from these cathodes to a digital winding 84 on a core 83.

Let the first state of this tube 63 be such that current goes from the large positive voltage at 60, through resistor 61 to the anode 62, from thence to the cold-cathode at 64. From here a part of it goes via clamping diode 73 and through Zener diode 76 to ground. The remaining current goes via precise resistor 77 to terminal 82, and then via "on" switch 86 to ground.

The tube may be a cold-cathode counting tube, such as the GSIOC made by Ericsson Ltd. (ETELCO) in England. The voltage drop from anode to a conducting cathode (the "maintaining voltage") is approximately the same for all ten cathodes. Regardless of what this voltage may be, or the voltage at 60, the voltage at the cathode is exactly established by the diode "clamping" to the Zener voltage across 76. Then the current (in this case through resistor 77) will be precisely defined. It will be noted that one only out of the ten cathodes conducts, so that the current through the Zener diode 76 will be approximately constant regardless of the count, or which cathode is conducting.

The one cathode which is conducting will "glow," thus indicating visually the count in that tube. An end view of tube 63' is given, showing how the ten cathodes (64, 67, 70 etc.) are arranged in a ring around a central anode 62. It is evident that as the count increases ("glow" travels clockwise) the digital M.M.F. (number of turns by current) increases in proportion.

Let cathode 64 represent zero. It has been seen that its current does not pass through any part of the digital winding 84. That is zero count contributes zero M.M.F. Now, let a trigger signal go to this counter, instructing it to count one (in this case to add one rather than subtract one). This trigger will cause a drive circuit to give two large negative pulses, one to terminal 72, and the second, a few microseconds later, to terminal 71. There are established drive circuits for counting tubes such as the GSIOC; in practice this invention uses a transistor blocking oscillator.

The first negative pulse on terminal 72 will cause all the transfer one pins 65, 68, 84 to go from a positive bias of 45 volts to a negative level of approximately 100 volts. The current on 64 will then move to transfer pin 65, as 65 is more negative. Between each pair of adjacent cathodes there is a transfer one pin and a transfer two pin. After a few microseconds transfer two pin 66 goes negative. Then pin 65 travels positive, so that the current ("glow") moves onto 66. Finally, when 66 goes back to its positive bias, cathode 67 will take the current from pin 66.

Following a brief interval (a fraction of a millisecond), during which the current increases in the path of resistor 78 and terminals 81 to 82, steady state M.M.F. conditions on the core will prevail. The cathode 67 is then clamped to the same Zener voltage as was cathode 64: its resistor 78 is identical to resistor 77; so that the current through resistor 78 is exactly equal to what it was through 77. The winding resistance in series to resistor 78 is negligibly small (a fraction of an ohm versus 33,000 ohms, in practice).

The core will now have a digital M.M.F. of two current-turns in the direction of 87. This M.M.F. corresponds to the count of "one" in the tube 63; i.e. the glow or current rests on cathode 67. At this time, and before the glow is moved away from cathode 67, the net M.M.F. on the core may be detected by the current interrupting procedure outlined previously. It is noted that FIGURE 3 for the sake of simplicity omits the signal and sense windings.

The next trigger coming into tube 63 drive will cause the current on cathode 67 to pass through transfers 68, 69 and come to rest on cathode 70. This is the count of two, the "glow" will be displayed opposite to the numeral two, and the digital M.M.F. is proportional to count two. That is, after a brief transient, the current from cathode 70 via precision resistor 79, and through the digital winding 84 from terminal 80 to terminal 82 will cause four current-turns of M.M.F. in direction 87. This is twice the M.M.F. that resulted from count one current into terminal 81, as might be expected.

It will be seen that all of the cathode resistors are identical, so that, if they all are subject to the same very small change of value, the ratio of the M.M.F.'s to each other remains unchanged. This ratio is also unaffected by small change in the reference Zener voltage across 76, since this has the same effect as the resistor change.

The system logic is such that a change in the polarity of the sense signal is used to stop further counting action by the decimal tube then in action. For example, if the four current-turns of M.M.F. resulting from current on cathode 70 exceeds the signal M.M.F. (while that on cathode 67 did not), then further triggers to this tube will be blocked. The tube then displays this count for some few seconds, until reset to the zero cathode 64. The whole comparison process then repeats, one decimal at a time, beginning with the most significant.

FIGURE 4 gives in block form the organization of these elements in a three decimal converter. While incomplete, enough elements are given to illustrate convertor action.

The three decimal tubes which act as switching means for the digital currents are numbered 90, 91 and 92. They count hundreds, tens and units respectively when balancing against a signal current. The various drive and gate circuits at these tubes' inputs are numbered 93 through 98.

The core for M.M.F. matching is now indicated by a dashed line 119; and the digital winding by 118, signal winding by 137, and sense winding by 120. A sense amplifier 125 goes to various logic (126 to 130) which in turn drives (by 131) a ring counter device at 132. This device has a multiplicity of elements, each element has an output terminal, and only one is "on" at any given instant. Lines from these elements go to the gates which control the triggers into the decimal counters, to the sense polarity gates, and to the display period control and reset gate.

The element which is "on" then permits a certain part of the logical cycle, usually by going to a gate. "Gate" is the term for a circuit which will give an output (voltage) when two or more inputs are in a certain state (for example, two positive inputs giving a positive voltage out).

The principal actions of the logical cycle for this converter are:

(1) Decimal tube 90 counting forward,
(2) Decimal tube 91 counting backwards, i.e. subtracting,
(3) Decimal tube 92 counting forward,
(4) Display of the three decimal digits, representing an analog signal magnitude,
(5) Reset of all the tubes to 0.

There are various possible ways to organize the logical parts. In the method of FIGURE 4 the indication begins at 000 and the hundreds increase until the sense signal polarity on winding 120 indicates that the digital M.M.F. exceeds the signal M.M.F. The tens are then decreased until the digital is less than the signal M.M.F., when the counting action is transferred to the units. The units increases the digital M.M.F., until it once more exceeds the signal M.M.F., at which time the logical cycle or "program" then stops all counting action, and a display interval begins.

There is one logical complication which will be explained before a detailed logical description is given. Let the signal be 382 units amplitude. Then four times one hundred will exceed the signal, and cause the logical cycle control 132 to gate the counting action into tube 91 for subtracting tens. But the hundreds tube 90 then indicates a "four" in place of a "three," and the tens tube has to proceed from zero to nine (i.e. add ninety) before it can begin to subtract. The solution here is to have a switch circuit 138 which adds one hundred units of digital M.M.F. when it is on. It is reset to "on" at the start of the logical cycle. Thus when the hundreds tube 90 is at three there are actually four hundred units of digital M.M.F.

The counting action then transfers to tube 91, which proceeds from "zero" to "nine". At this time, and well before the next current interruption test at the core, the switch 138 is switched off. The hundred units of digital M.M.F. then vanishes (535), and the real digital M.M.F. corresponds to the indication of tubes 90 and 91, that is, at this instant, 390 units.

The switch 138 may be a cold cathode trigger tube, having one cathode only, and that cathode clamped to the Zener as previously described. The cathode M.M.F. current proceeds via a precise resistor to the same winding terminal 115 as the "one" cathode on the hundreds tube.

Before going on with a step-by-step description, the connections of the windings should be noted. In the hundreds tube 90 cathodes 103 and 102, "one" and "nine" respectively, are shown with their connections to the digital winding. All ten cathodes are connected to different terminals on this winding, but for ease of understanding the logical action, only two are shown. For tens tube 91, only cathode 104, the "one," is shown with its connection. Similarly, units tube 92 has cathode 105, the "one," drawn. It is further understood that all clamping diodes, including 110, 111, 112 and 113, go to a common Zener reference voltage.

In the working model this Zener voltage was +33 volts, and cathode resistors 106, 107, 108 were 33,000 ohm 0.1% wire-wound resistors. Terminal 114 was 900 turns away from terminal 117, and terminal 115 just one hundred turns, i.e. in the ratio of the cathode "count" to which they are connected. Terminal 116 was ten turns from 117, for "one times ten." Rather than make resistor 109 on the "one times ten" cathode equal to the resistors on the hundreds and tens cathodes, it was made ten times as large, i.e. 330,000 ohms. This means that the units cathodes can use the same digital winding taps (terminals) as the tens tube, making for a transformer easier to manufacture. If the 330,000 resistors are not quite as stable, or behave differently from the 33,000 ohm ones, the resulting error is negligible, since only units are affected.

The timing pulses are shown at 136' (trigger), 122' (test), and 130' (strobe). There is a relatively long interval between trigger 136' and test 122', to give the digital winding currents transients time to disappear following a change of count. The stroke pulse is a very narrow pulse which enables the sense signal polarity to be recognized at the most favorable time within the test period, as will be explained.

Initially, the count tubes 90, 91, 92 have been reset to 000, switch 138 is on, and the program or control 132 is at "one" position, to permit counting action in tube 90. If the signal in at terminal 89 may be negative as well as positive, then the first action is that a test pulse 122 will turn off the transistor switches at 121 and 141. If the sense signal then indicates by its polarity that the signal is less than 000, the signal M.M.F. polarity is then reversed by use of winding 139 and switch 140, in place of winding 137 and switch 141, in the following logical cycle. It will be seen that for the possible negative case, switch 138 can not be turned "on" (reset) until after this initial test pulse. If the indication is that the signal exceeds 000, winding 137 and switch 141 are used in the cycle.

Let a signal of 382 units, unchanging during the counting and comparing part of the cycle, be assumed. Then the first trigger on line 136 will then cause tube 90 to advance one, following a test pulse which indicated a signal larger than one hundred. (000 indicated.)

FIGURE 5 gives the path of the "glows" on the tube ends, for the example of a 382 unit signal. The successive logical steps for this example are indicated in the following table:

| Logic Step | Tube Indicate | Digital M.M.F. | Sense M.M.F.[a] |
|---|---|---|---|
| 1 | 000 | 100 | + |
| 2 | 100 | 200 | + |
| 3 | 200 | 300 | + |
| 4 | 300 | 400 | − |
| 5 | 390 | [b]390 | − |
| 6 | 380 | 380 | + |
| 7 | 381 | 381 | + |
| 8 | 382 | 382 | − |
| 9 | Display | | |
| 10 | 000 | 100 | Reset |

[a] + for signal > digits.
[b] Switch 138 off 100 units.

Tube 90 is then, at step two, on cathode one, giving one hundred units of M.M.F. This adds to that due to the current from switch 139 being on, for a total of two hundred units. The following test pulse 122 will interrupt the digital and signal current paths, and the resultant flux change ("back E.M.F.") will link sense winding 120.

In the model one end 124 of the winding 120 was at ground, and amplifier 135 increased the signal amplitude approximately one hundred times. Both phases (polarities) of the amplified signal were then connected to gates 128 and 129. The strobe was connected to terminals 130, going to these same gates. The program 132 determines which gate will be responsive. Thus, on program one, gate 128 is active, and awaiting for a sense signal polarity which indicates a negative sense M.M.F. (refer to table of FIGURE 5).

Thus, the test at step two will result in a positive sense M.M.F., or a pulse going to gate 129, which, however, is inactive because only program "one," which is line 126, is active. Since the wrong polarity of pulse goes to gate 128 for it is to have an output, neither will give a pulse to "Or" gate 142; drive 131 will be inactive; and the program 132 will not change.

This means that the next trigger pulse will enter tube 90 via gate 96 and drive 93, since program one voltage on line 133 allows gate 96 to pass this trigger 136. Thus, tube 90 will move its current to cathode two on step three. The following test pulse will give the same condition of gates 128 and 129, both inactive, as signal 382 still exceeds the real digital M.M.F. of 300.

Tube 90 then goes to three (hundred), with an added one hundred units of M.M.F. still coming from switch 138. In this case, digital 400 exceeds signal 382 M.M.F., so that the sense signal voltage polarity on winding 120 now reverses. Gate 128 then gives an output which moves the program on one. That is, program control 132 goes to two, which makes line 134 active.

The next trigger arriving at terminal 100 of gate 97 passes through, since line 134 goes to this gate. This in turn triggers drive 94, and tens tube 91 goes from zero to nine; that is, the current moves in a reverse direction onto cathode nine. As explained for FIGURE 3, the reversal of "glow" movement is achieved by simply changing (wired in) the transfer pin connections to the negative transfer pulses. At this same time, at the start of step five, switch 138 is turned off. There are now 390 units of digital M.M.F., and since this exceeds the signal 382, gate 129 (the active gate) will not give an output.

The following trigger will then again pass via gate 97 to tube 91, changing the count to 380, which is at this time also the digital M.M.F. applied to winding 118 on core 119. Thus, on step 6, signal 382 exceeds digital 380, and gate 129 yields an output via 130 and 131 to program control 132. Program control then goes to three, which will allow the next trigger to go through gate 98, as line 135 is active. Line 135 also makes gate 128 receptive to a sense pulse, corresponding to a negative sense M.M.F. Units tube 92 then counts through logical steps seven and eight, at which time the test gives a pulse out of gate 128 which moves the program control onto display. In this part of the logical cycle none of the triggers can pass through gates 96, 97 and 98; and so the tube count remains static. The test pulses have no effect as both gates 128 and 129 are inactive. Interruption of digital winding 118 current by transistor 121 does not affect the cathod "glow," since the cathode current merely transfers to the clamping diode path during this interruption.

After a suitable period a simple circuit giving a pulse every second or two, in synchronism with a trigger pulse, causes the program control 132 to advance to five. As it proceeds to five on step ten, a reset command is generated, which resets tubes 90, 91, 92 to zero and turns switch 138 on (if no negative input to 89 be considered).

The lagging edge of the next trigger pulse, or the next test pulse, is directly gated into the program control. This then goes to the logical interval "one" where tube 90 (hundreds) is prepared to accept triggers; and the whole logical cycle repeats.

There are several interesting variations of this logical cycle and of the switching arrangement on the windings.

For example, the count could be reset to 555 in stages, and the initial sense signal polarity used to alter the transfer pulse switching to the tubes 90, 91, 92 so that they count either forward or backward. Thus, for a signal of 437 the hundreds comparison reset is 500 and tube 90 counts backwards, looking for a sense polarity saying that the unknown signal M.M.F. exceeds the digital M.M.F. While this sort of logical cycle reduces the time for counting, it adds complication to the switching arrangements.

It is also possible to make conversions of the sum or difference of more than one signal input by provision of one winding of the proper M.M.F. sense for each signal. That is to say, the signal M.M.F.'s will add or subtract in the core when being compared to the digital M.M.F.

Changes of scale, such as decimal point placing at the start of the logical cycle, can be achieved by change of the common clamp (Zener) voltage, or by switched change of the number of turns on the signal winding. Thus, for example, a signal which gave an M.M.F. exceeding a digital M.M.F. of 1000 at the start, could cause a switch to change the number of signal turns to one-tenth of the original. This same switch would then move the decimal point on the display one place to the right.

While there have been shown and described and pointed out the fundamental novel features of the invention as applied to a referred embodiment, it will be understood that various omissions and substitutions and changes in the form and details of the device illustrated and in its operation may be made by those skilled in the art, without departing from the spirit of the invention. It is the intention, therefore, to be limited only by the scope of the following claims.

I claim:

1. An analog-to-digital converter, comprising a magnetic core, said core being formed from material characterized by a relatively high initial permeability and a relatively low reluctance, analog winding disposed about said core for receiving analog input signals and to thereby apply analog magnetomotive forces to said core below the saturation level of said core, digital winding disposed about said core, the turns of said digital winding being proportional to each digit in a digital sequence, means to apply a series of currents to said digital winding to generate in said core magnetomotive forces below the saturation level of said core opposing said analog magnetomotive forces, sensing winding disposed about said core for interrupting said magnetomotive forces to return said core to zero magnetomotive force and means connected to said sensing winding for indicating the direction of the net magnetomotive forces generated within said core by said analog and digital winding.

2. An analog-to-digital converter according to claim 1 including switching means for simultaneously switching off the analog and digital input signals to said core and thereby produce a differential voltage of a polarity corresponding to the net magnetomotive forces, said polarity being indicative of the relative strength of the analog and digital signals.

3. An analog-to-digital converter, comprising a magnetic core, said core being formed from material characterized by a high initial permeability, analog windings disposed about said core for receiving analog input signals and to thereby apply analog magnetomotive force within said core less than the saturation level thereof, digital winding disposed about said core, the turns of said digital winding being proportional to each digit in a digital sequence, means to apply a series of currents to said digital winding to generate within said core magnetomotive forces less than the saturation level thereof and opposing said analog magnetomotive forces, the resultant net magnetomotive force producing an appreciable flux change in said core, sensing winding disposed about said core, switching means to cause said net magnetomotive force to go to zero, and means connected to said sensing winding for indicating the polarity of the resulting voltage produced in said sensing winding, said polarity being determined by the direction of the net magnetomotive forces generated by said analog and digital windings.

4. An analog-to-digital converter according to claim 3 including means responsive to a change in the polarity of the net magnetomotive force for terminating the input of digital currents.

5. An analog-to-digital converter according to claim 3 wherein said means to apply a series of currents to said digital winding includes at least one cold cathode counting tube.

6. A digital-to-analog converter, comprising
  (a) a core of a material characterized by high initial permeability,
  (b) analog winding disposed about said core for receiving analog input signals and to thereby apply analog magnetomotive forces to said core less than the saturation level thereof,
  (c) digital winding disposed about said core,
  (d) at least one cold cathode counting tube connected to said digital winding for applying a series of currents thereto to generate in said core magnetomotive forces less than the saturation level thereof in opposition to said analog forces,
  (e) precision resistors connected between said tube and selected portions of said digital windings,
  (f) a Zener diode connected to said resistors and ground for maintaining precise voltage levels across said resistors,
  (g) sensing winding disposed about said core to return said core to zero magnetomotive force, and
  (h) means connected to said sensing winding for indicating the directions of the net magnetomotive force in said core.

7. A digital-to-analog converter according to claim 6 including means responsive to a change in the polarity of said core for stopping the count in said tube, the accumulated count on said tube thereby corresponding to the analog magnetomotive forces in said core.

8. A digital-to-analog converter, comprising
   (a) a core of a material characterized by a high initial permeability,
   (b) analog winding disposed about said core for receiving analog input signals and to thereby apply analog magnetomotive forces to said core less than the saturation level thereof,
   (c) digital winding disposed about said core,
   (d) a plurality of decimal counting tubes connected to said digital winding for applying a series of currents thereto to generate in said core magnetomotive forces less than the saturation level thereof in opposition to said analog forces,
   (e) said tubes being adapted to count in decimal groupings and arranged in a logical progressive sequence,
   (f) the tube for counting the most significant decimal grouping being also adapted to add in increments of said grouping,
   (g) the tube for the next lower significant grouping being adapted to subtract in increments of said next lower significant grouping,
   (h) sensing winding disposed about said core,
   (i) detecting means connected to said sensing winding for detecting the direction of the net magnetomotive force in said core, and
   (j) switching means connected to said detecting means and responsive to a change in direction of said net magnetomotive force for actuating said tubes sequentially.

9. A digital-to-analog converter according to claim 8 including other switching means for cyclically subtracting a single increment from the most significant grouping.

References Cited by the Examiner
UNITED STATES PATENTS

| | | | |
|---|---|---|---|
| 3,030,618 | 4/1962 | Nilsson | 340—347 |
| 3,067,414 | 12/1962 | Kelly | 340—347 |
| 3,068,462 | 12/1962 | Medoff | 340—347 |
| 3,079,598 | 2/1963 | Wald | 340—347 |
| 3,113,300 | 12/1963 | Sullivan | 340—347 |

MALCOLM A. MORRISON, *Primary Examiner.*